United States Patent
Kato

(10) Patent No.: US 6,170,167 B1
(45) Date of Patent: Jan. 9, 2001

(54) STRUCTURE FOR ATTACHING DRYING AGENT TO LENS BARREL

(75) Inventor: Hiroshi Kato, Omiya (JP)

(73) Assignee: Fuji Photo Optical Co., Ltd., Omiya (JP)

(*) Notice: Under 35 U.S.C. 154(b), the term of this patent shall be extended for 0 days.

(21) Appl. No.: 09/379,366

(22) Filed: Aug. 23, 1999

(30) Foreign Application Priority Data

Aug. 31, 1998 (JP) .................................................. 10-245143

(51) Int. Cl.[7] .................................................. F26B 21/06
(52) U.S. Cl. ........................................ 34/80; 34/82; 34/95
(58) Field of Search .................................. 34/80, 81, 82, 34/95; 359/694, 703, 704

(56) References Cited

U.S. PATENT DOCUMENTS

| | | | |
|---|---|---|---|
| 4,755,031 | * | 7/1988 | Daviau et al. .......................... 350/588 |
| 4,796,163 | * | 1/1989 | Dressier ................................... 362/61 |
| 4,809,144 | * | 2/1989 | Suzuki ..................................... 362/294 |

* cited by examiner

Primary Examiner—Pamela Wilson
Assistant Examiner—Michelle A. Mattera
(74) Attorney, Agent, or Firm—Nixon Peabody LLP; David S. Safran

(57) ABSTRACT

A structure for detachably attaching a drying agent unit to a lens barrel without increasing the size of the lens barrel. An opening for ventilation is formed in the circumference of the lens barrel. The drying agent unit comprises a container containing the drying agent. The container is provided with an opening. The drying agent unit is detachably attached to the lens barrel through a fixing mechanism such as fixing screws. The container communicates with the inside of the lens barrel through the openings in the attached state. Alternatively, the drying agent may be formed in a shape capable of fitting itself into the opening of the lens barrel, and a part of an outer surface of the drying agent that is exposed in the attached state is coated with an unbreathable coating. This eliminates the necessity of providing a container for the drying agent.

4 Claims, 7 Drawing Sheets

F I G. 9
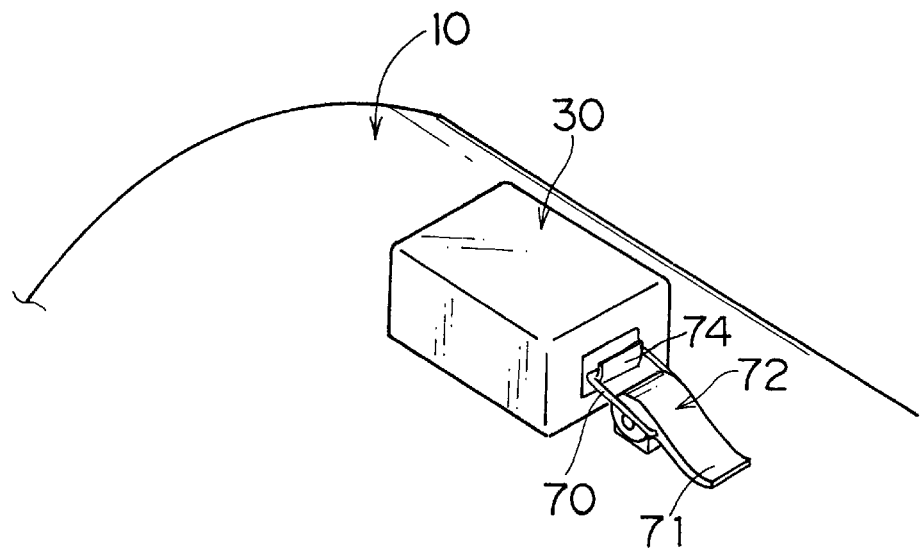
F I G. 1 0
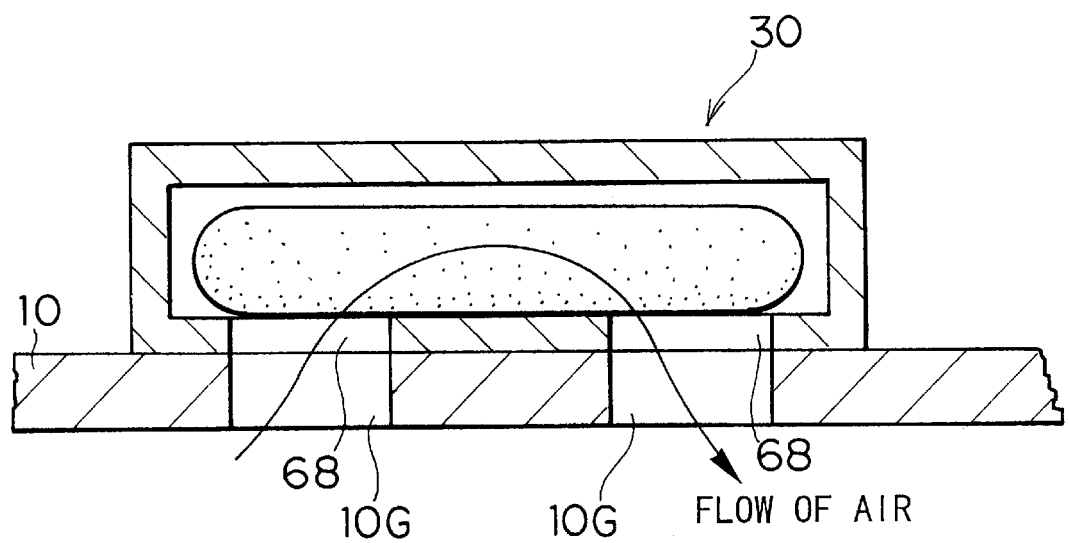

STRUCTURE FOR ATTACHING DRYING AGENT TO LENS BARREL

BACKGROUND OF THE INVENTION

1. Field of the Invention

The present invention relates generally to the structure for attaching a drying agent, which dehumidifies the inside of a lens barrel to prevent lenses therein from getting fogged, to the lens barrel.

2. Description of Related Art

A lens apparatus for use in a TV camera, etc. uses a drying agent, which dehumidifies the inside of a lens barrel to prevent lenses therein from being fogged. For example, tablets of the drying agent or a bag holding powders or grains of the drying agent is contained in a cavity provided at the lens barrel. Alternatively, a hollow for containing the drying agent and an opening for connecting the hollow with the inside of the lens barrel are formed at the circumference of the lens barrel, and a cover is attached to close the hollow after the drying agent is placed in the hollow.

In the above-mentioned conventional methods, however, the lens barrel must be large in order to include the drying agent therein. In addition, the drying agents, contained in the hollow integrated with the lens barrel, must be exchanged after the cover is removed, and this is very troublesome.

SUMMARY OF THE INVENTION

In view of the foregoing, it is an object of the present invention to provide the structure for attaching a drying agent to a lens barrel that facilitates the exchange of the drying agents without increasing the size of the lens barrel.

To achieve the above-mentioned object, the present invention is directed to a structure for attaching a drying agent to a lens barrel, the structure comprising: an opening formed in a circumference of the lens barrel; and a drying agent unit including a container containing the drying agent, the drying agent unit being attached to the lens barrel, the container having an opening, the container communicating with an inside of the lens barrel through the openings in a state where the drying agent unit is attached to the lens barrel.

According to the present invention, the drying agent unit is constructed in such a manner that the drying agent is contained in the container, which is detachably attached to the lens barrel. The entire unit including the container is attached to and detached from the lens barrel. When the drying agent unit is attached to the lens barrel, the inside of the lens barrel communicates with the container, and the drying agent in the container dehumidifies the inside of the lens barrel. This facilitates the attachment of the drying agent without increasing the size of the lens barrel.

Preferably, the container has a transparent window, through which a state of the drying agent is observed from outside. Thus, the state of the drying agent can be observed from outside and it is possible to know when the drying agents should be exchanged.

To achieve the above-mentioned object, the present invention is directed to a structure for attaching a drying agent to a lens barrel, the structure comprising: an opening formed in a circumference of the lens barrel; and the drying agent formed in a shape capable of fitting into the opening, the drying agent being fitted in the opening to be attached to the lens barrel, a part of a surface of the drying agent exposed in a state where the drying agent is fitted in the opening being coated with an unbreathable coating.

According to the present invention, the drying agent itself can be fitted directly into the opening without providing the container for containing the drying agent. This facilitates the exchange of the drying agents without increasing the size of the lens barrel.

Preferably, the unbreathable coating has a transparent part, so that the state of the drying agent can be observed from outside. It is therefore possible to know when the drying agents should be exchanged.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 9 is a perspective view showing another embodiment of a mechanism for attaching the drying agent unit to the lens barrel;

FIG. 10 is a sectional view showing an example for improving the ventilation of the drying agent unit;

DETAILED DESCRIPTION OF THE PREFERRED EMBODIMENT

This invention will be described in further detail by way of example with reference to the accompanying drawings.

Figure 1:
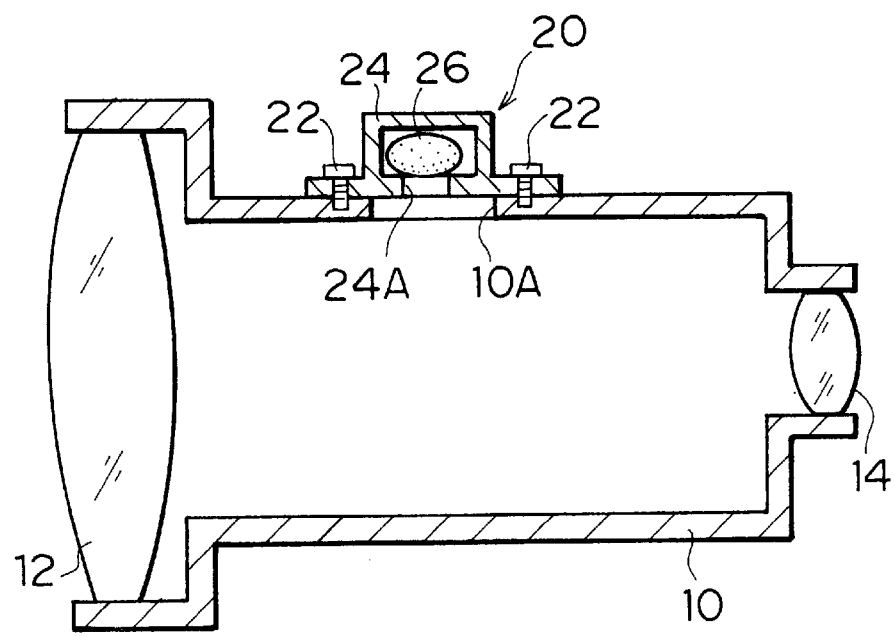
FIG. 1 is a sectional view showing the first embodiment of the present invention.

FIG. 1 is a sectional view showing the first embodiment of the present invention. Lenses 12, 14 are disposed in a lens barrel 10. Although only two lenses 12, 14 are illustrated in FIG. 1, the number of lenses is not restricted to this. Generally, a plurality of lenses is arranged within the lens barrel 10. For example, a lens barrel for use in a TV camera includes a variety of lens groups such as a fixed focus lens group, a movable focus lens group, a variable frame lens group, a correcting lens group and a master lens group.

An opening 10A for ventilation is formed in the circumference of the lens barrel 10. A drying agent unit 20 is detachably attached on the outer circumference of the lens barrel 10 with fixing screws 22 at the opening 10A. In the drying agent unit 20, a drying agent 26 is contained in a container 24 and an opening 24A for ventilation is formed at the bottom of the container 24. The air flows between the inside of the lens barrel 10 and the container 24 through the openings 24A, 10A, and the drying agent 26 dehumidifies the inside of the lens barrel 10. The drying agent 26 may be of various forms such as one or more of tablet and a bag holding powders or grains of the drying agent.

Taking the fixing screws 22 off easily detaches the drying agent unit 20 from the lens barrel 10, and the drying agent 26 can be exchanged easily.

Figure 2:
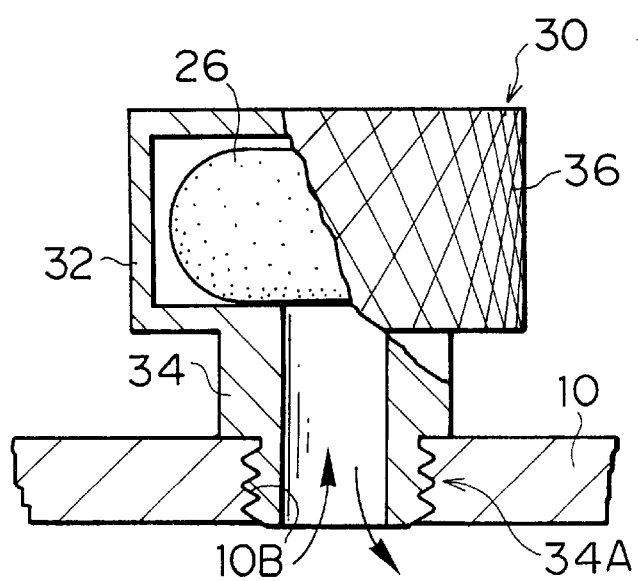
FIG. 2 is a sectional view showing the essential parts of the second embodiment of the present invention.

FIG. 2 is a sectional view showing the essential parts of the second embodiment of the present invention. In FIG. 2, parts similar to those described with reference to FIG. 1 are denoted by the same reference numerals, and they will not be described here. In FIG. 1, the drying agent unit 20 is attached to the lens barrel 10 with the fixing screws 22. In FIG. 2, alternatively, a threaded opening 10B is formed in the circumference of the lens barrel 10, and a drying agent unit 30 takes the form of a screw so that it can be directly attached to the lens barrel 10.

A container 32 for containing the drying agent 26 has a hollow shank 34, and a threaded part 34A is formed at the bottom of the shank 34. The threaded part 34A can be engaged with the threaded opening 10B. When the threaded part 34A of the drying agent unit 30 is engaged with the threaded opening 10B of the lens barrel 10, the inside of the lens barrel 10 communicates with the inside of the container 32 through the hollow shank 34, and the drying agent 26 dehumidifies the inside of the lens barrel 10. The outer circumferential surface 36 of the container 32 is knurled to assist in obtaining a firm grip. The container 32 can be turned easily with the thumb and a finger gripping the circumferential surface 36. Thus, the drying agent unit 30 can easily be attached to and detached from the lens barrel 10.

Figure 3:
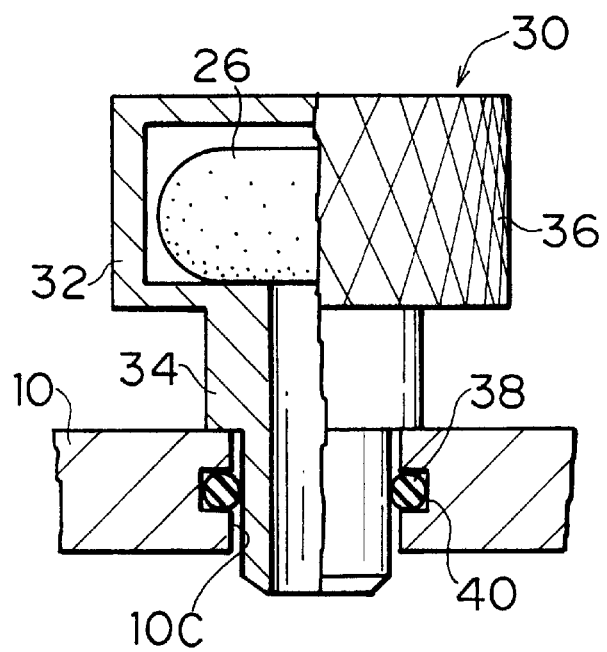
FIG. 3 is a sectional view showing the essential parts of the third embodiment of the present invention.

FIG. 3 is a sectional view showing the essential parts of the third embodiment of the present invention. In FIG. 3, parts similar to those described with reference to FIG. 2 are denoted by the same reference numerals, and they will not be described here. The drying agent unit 30 in FIG. 3 takes the form that can be fitted into an opening 10C of the lens barrel 10. More specifically, an O-ring groove 38 is formed on the inner circumferential surface of the opening 10C of the lens barrel 10, and an O-ring 40 is inserted in the O-ring groove 38. The shank 34 of the drying agent unit 30 is pressed into the opening part 10C, so that the drying agent unit 30 can be attached to the lens barrel 10. The drying agent unit 30 can easily be detached by pulling it upward in FIG. 3.

Figure 4:
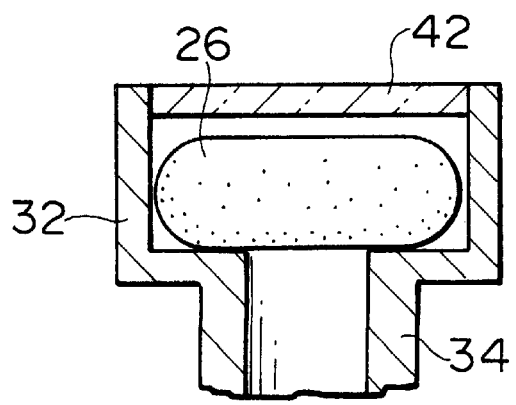
FIG. 4 is a sectional view showing the essential parts of another embodiment of a container in a drying agent unit.

In the embodiments described with reference to FIGS. 1–3, the containers 24, 32 can partially or entirely be made of a transparent member so that the state of the drying agent 26 can be seen from outside. FIG. 4 shows an example wherein the top of the container 32 is made of a transparent member 42. It is therefore possible to know when the drying agent 26 should be replaced by a new one.

Figure 5:
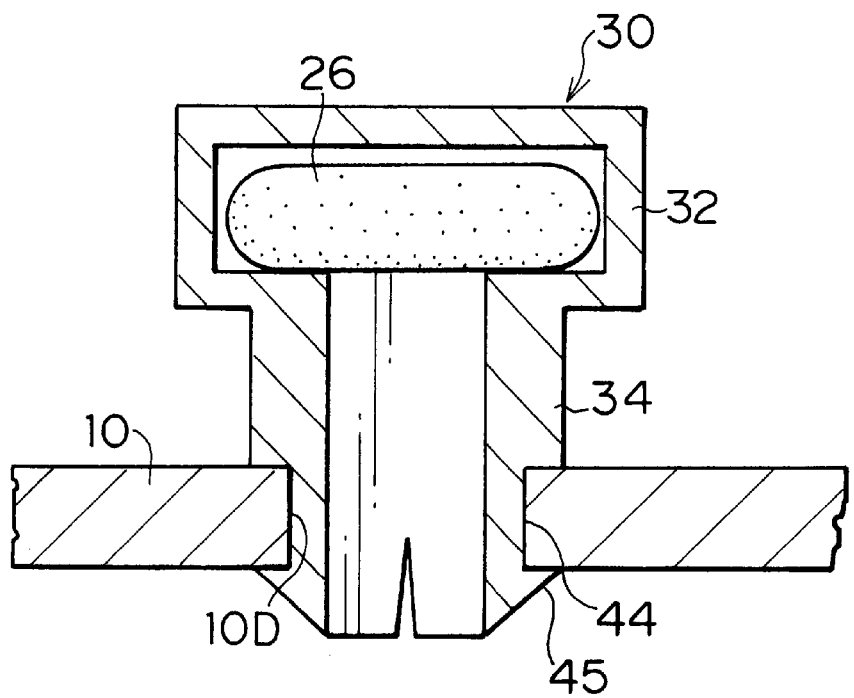
FIG. 5 is a sectional view showing the essential parts of the fourth embodiment of the present invention.

FIG. 5 is a sectional view showing the essential parts of the fourth embodiment of the present invention. In FIG. 5, parts similar to those described with reference to FIG. 2 are denoted by the same reference numerals, and they will not be described here. The drying agent unit 30 in FIG. 5 has a groove 44 formed at the circumference of the shank 34. The edge of an opening 10D of the lens barrel 10 is fitted in the groove 44. The bottom end of the shank 34 is tapered so that it can easily be inserted into the opening 10D.

Figure 6:
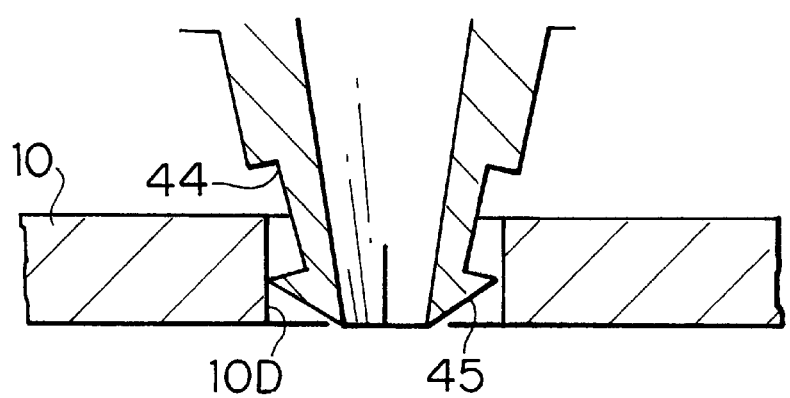
FIG. 6 is a sectional view showing a state where the drying agent unit in FIG. 5 becomes attached into a lens barrel.

As shown in FIG. 6, when the shank 34 of the drying agent unit 30 is inserted into the opening 10D from upward, the tapered part slides on the edge of the opening 10D to elastically deform the shank 34 inward. When a hook 45 of the shank 34 passes the bottom end of the opening 10D, the shank 34 is relieved from the deforming force and is restored to the original state by its elastic force. Consequently, the edge of the opening 10D is fitted in the groove 44, and the drying agent unit 30 is attached to the lens barrel 10.

Figure 7:
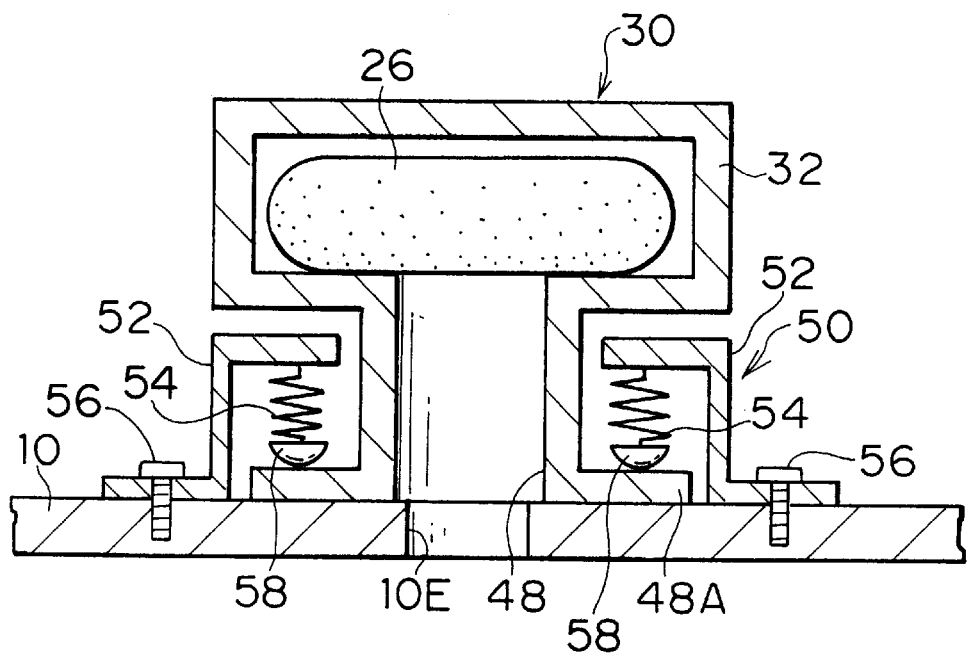
FIG. 7 is a sectional view showing the essential parts of the fifth embodiment of the present invention.

FIG. 7 is a sectional view showing the essential parts of the fifth embodiment of the present invention. In FIG. 7, parts similar to those described with reference to FIG. 2 are denoted by the same reference numerals, and they will not be described here. The drying agent unit 30 in FIG. 7 has a shank 48, which forms an air passage at the bottom of the container 32. A flat base 48A is formed at the bottom end of the shank 48.

On the other hand, a fixing mechanism 50 for fixing the drying agent unit 30 is attached to the lens barrel 10. The fixing mechanism 50 comprises supporting members 52, which stand around an opening 10E formed in the lens barrel 10; and spring members 54, which are arranged inside the supporting members 52 in such a way as to expand and contract vertically. The supporting members 52 are fixed on the lens barrel 10 through fixing screws 56. The supporting members 52 fix the top ends of the spring members 54, and the bottom ends of the spring members 54 are provided with contact members 58, which contact with the base 48A of the shank 48.

The drying agent unit 30 can be inserted into and extracted from the fixing mechanism 50 by sliding it vertically with respect to the drawing. When the shank 48 (the base 48A) of the drying agent unit 30 is inserted into a gap defined by the circumferential surface of the lens barrel 10 and the supporting members 52, the contact members 58 run onto the base 48A to thereby contract the spring members 54. Consequently, the base 48A is pressed against the circumferential surface of the lens barrel 10 with the elastic forces of the spring members 54, and thus, the drying agent unit 30 are fixed on the lens barrel 10. The drying agent unit 30 can be detached easily by sliding it vertically with respect to the drawing in reverse order.

The contact members 58 in FIG. 7 are hemispheres, but it may be of various shapes such as a sphere, a cone and a trapezoid as long as the contact members 58 are able to reduce friction between the base 48A of the drying agent unit 30 and the contact members 58 and transmit the elastic forces of the spring members 54 to the base 48A while keeping the spring members 54 vertical.

Figure 8:
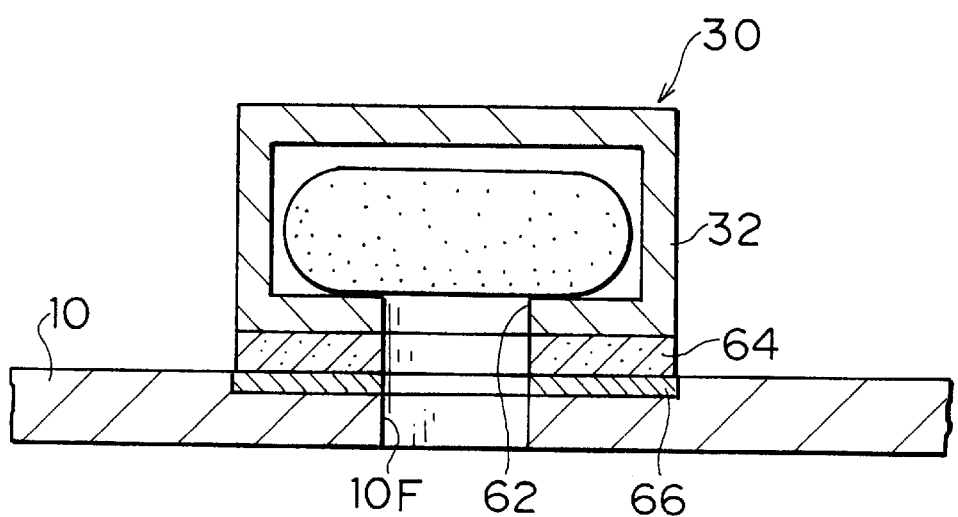
FIG. 8 is a sectional view showing the essential parts of the sixth embodiment of the present invention.

FIG. 8 is a sectional view showing the essential parts of the sixth embodiment of the present invention. In FIG. 8, parts similar to those described with reference to FIG. 2 are denoted by the same reference numerals, and they will not be described here. In the drying agent unit 30 in FIG. 8, an opening 62 is formed in the bottom of the container 32. A magnet 64 is secured to the circumference of the opening 62. On the other hand, an iron plate 66 is provided around an opening 10F of the lens barrel 10. The drying agent unit 30 is attached to the lens barrel 10 by attraction between the magnet 64 and the iron plate 66.

The drying agent unit 30 may be attached to the circumference of the lens barrel 10 through a variety of mechanisms in addition to those described with reference to FIGS. 1–8. For example, as shown in FIG. 9, a lock member 72 such as a brace composed of a ring 70 and a lever 71 is provided on the lens barrel 10, and a hook 74 is provided to the drying agent unit 30. The ring 70 of the lock member 72 is hung on the hook 74, and the lever 71 is brought into a horizontal state. This gives a tension to the ring 70, and fixes the drying agent unit 30 to the lens barrel 10.

As improvements in the embodiments described with reference to FIGS. 1–8, two or more openings 10G are formed in the lens barrel 10 as shown in FIG. 10, and two or more openings 68 are formed in the bottom of the container 32 of the drying agent unit 30 correspondingly to the openings 10G. This causes the air to flow more satisfactorily.

Figure 11:
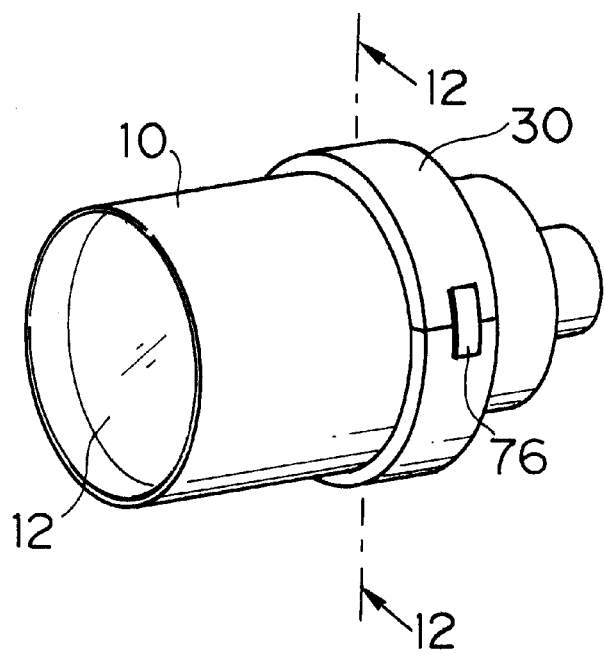
FIG. 11 is a perspective view showing the seventh embodiment of the present invention.
Figure 12:
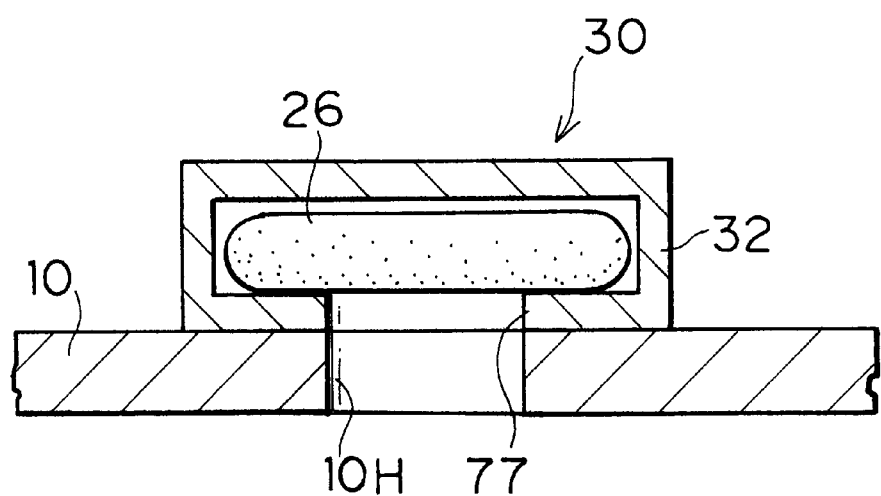
FIG. 12 is a sectional view taken along a line 12—12 in FIG. 11.

FIG. 11 is a perspective view showing the seventh embodiment of the present invention, and FIG. 12 is a sectional view taken along a line 12—12 in FIG. 11. As shown in FIGS. 11 and 12, the drying agent unit 30 is ring-shaped so that it can be wound around the outer circumference of the lens barrel 10. Reference numeral 76 indicates a connecting member. The container 32 of the drying agent unit 30 contains the drying agent 26, and one, or more preferably multiple, opening 77 is formed in the inner circumference of the container 32. On the other hand, one, or more preferably multiple, opening 10H is formed in the lens barrel 10 correspondingly to the opening 77 of the drying agent unit 30. The ring-shaped drying agent unit 30 is attached on the lens barrel 10 so that the opening 77 can correspond to the opening 10H, and the drying agent 26 dehumidifies the inside of the lens barrel 10.

Figure 13:
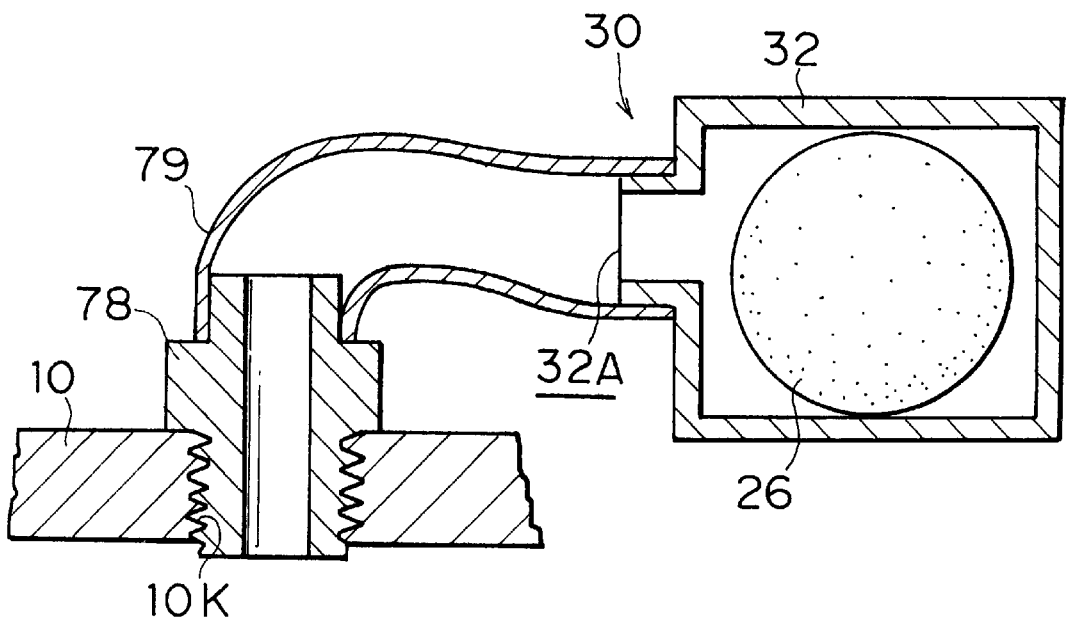
FIG. 13 is a sectional view showing the essential parts of the eighth embodiment of the present invention.

FIG. 13 is a sectional view showing the eighth embodiment of the present invention. The drying agent unit 30 in FIG. 13 comprises a joint 78 engaged with a threaded opening 10K of the lens barrel 10, the container 32 for containing the drying agent 26, and a tube 79 for connecting an opening 32A of the container 32 and the joint 78. In this embodiment, it is possible to freely choose a position where the drying agent unit 30 is attached since the inside of the lens barrel 10 communicates with the container 32 through the tube 79, of which length and form can easily be changed. As is the case with the embodiment described with reference to FIG. 12, multiple openings may be formed in the container 32 and the lens barrel 10 in order to increase the number of air passages and flow the air more satisfactorily.

Figure 14:
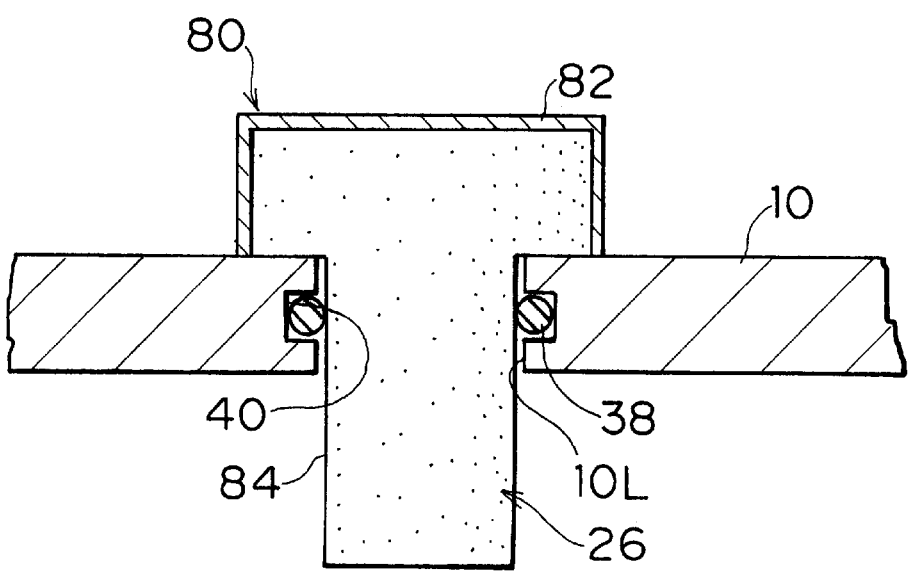
FIG. 14 is a sectional view showing the essential parts of the ninth embodiment of the present invention.

FIG. 14 is a sectional view showing the essential parts of the ninth embodiment of the present invention. In the embodiments described with reference to FIGS. 1–13, the drying agent 26 is contained in the container of the drying agent unit 30. In FIG. 14, alternatively, a drying agent unit 80 has no container and the drying agent 26 is formed in such a way as to fit itself into an opening 10L formed in the lens barrel 10. An unbreathable coating 82 is applied on a part of the outer surface of the drying agent 26 that is exposed in the attached state. If the outer surface (exposed surface) of the drying agent 26 is exposed to the air outside, it wastefully absorbs the moisture in the air outside. For this reason, the unbreathable coating 82 is applied on the outer surface of the drying agent 26 in order to shut off the air from the drying agent 26.

The drying agent unit 80 is attached to the lens barrel 10 in the same manner as described with reference to FIG. 3. More specifically, the O-ring groove 38 is formed at the inner circumference of the opening 10L formed in the lens barrel 10, and the O-ring 40 is inserted in the O-ring groove 38. The drying agent unit 80 is attached to the lens barrel 10 by inserting a shank 84 of the drying agent unit 80 into the opening 10L. The drying agent unit 80 can easily be detached from the lens barrel 10 by pulling it upward as in FIG. 3.

As is the case with the embodiment described with reference to FIG. 4, the coating 82 can be partially or entirely made of a transparent material, so that the state of the drying agent 26 can be observed from the outside of the drying agent unit 80. It is therefore possible to know when the drying agent 26 should be replaced by a new one.

In the embodiments described with reference to FIGS. 1–14, the drying agent can easily be attached to and detached from the lens barrel and can be exchanged easily without increasing the size of the lens barrel.

As set forth hereinabove, in the structure for attaching the drying agent to the lens barrel according to the invention, the drying agent unit is constructed in such a manner that the drying agent is contained in the container, which is detachably attached to the lens barrel; and the opening for ventilation is formed at the circumference of the lens barrel. Therefore, the drying agent can be detachably attached to the lens barrel without increasing the size of the lens barrel, and the drying agents can be exchanged easily.

In another structure for attaching the drying agent to the lens barrel according to the invention, the drying agent is formed in such a manner as to fit into the opening of the lens barrel, and the coating for shutting off the air outside is formed at a part of the outer surface of the drying agent that is exposed in the attached state. Therefore, the drying agent can easily be attached to the lens barrel without increasing the size of the lens barrel and without providing the container for containing the drying agent, and the drying agents can be exchanged easily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A structure for attaching a drying agent to a camera lens barrel, the structure comprising:

an opening formed in a circumference of the lens barrel; and a drying agent unit including a container containing the drying agent, the drying agent unit being attached to the lens barrel, the container having an opening, the container communicating with an inside of the lens barrel through the opening in a state where the drying agent unit is attached on the circumference of the lens barrel.

2. A structure for attaching a drying agent to the lens barrel, the structure comprising:

an opening formed in a circumference of the lens barrel; and a drying agent unit including a container containing the drying agent, the drying agent unit being attached to the lens barrel, the container having an opening, the container communicating with an inside of the lens barrel through the opening in a state where the drying agent unit is attached to the lens barrel; wherein the container has a transparent window, a state of the drying agent being observed from outside through the transparent window.

3. A structure for attaching a drying agent to a lens barrel, the structure comprising:

an opening formed in a circumference of the lens barrel; and the drying agent formed in a shape capable of fitting into the opening, the drying agent being fitted in the opening to be attached to the lens barrel, a part of a surface of the drying agent, exposed in a state where the drying agent is fitted in the opening, being coated with an unbreathable coating.

4. The structure for attaching the drying agent to the lens barrel as defined in claim 3, wherein the unbreathable coating has a transparent part, a state of the drying agent being observed from outside through the transparent part.

* * * * *